United States Patent
Danze et al.

(10) Patent No.: US 9,302,606 B2
(45) Date of Patent: Apr. 5, 2016

(54) SELF-TIGHTENING HOLDING STRAP

(71) Applicants: Alex Danze, Riverside, CA (US); Bruce Scranton, Riverside, CA (US)

(72) Inventors: Alex Danze, Riverside, CA (US); Bruce Scranton, Riverside, CA (US)

(73) Assignee: Polaris Industries Inc., Medina, MN (US)

( * ) Notice: Subject to any disclaimer, the term of this patent is extended or adjusted under 35 U.S.C. 154(b) by 277 days.

(21) Appl. No.: 14/094,549

(22) Filed: Dec. 2, 2013

(65) Prior Publication Data

US 2015/0150342 A1 Jun. 4, 2015

(51) Int. Cl.
*B60P 7/08* (2006.01)
*B60J 7/10* (2006.01)

(52) U.S. Cl.
CPC ............... *B60P 7/0823* (2013.01); *B60J 7/104* (2013.01); *Y10T 24/2192* (2015.01)

(58) Field of Classification Search
CPC ............ Y10T 24/2708; Y10T 24/4047; Y10T 24/1397; Y10T 24/314; Y10T 24/316; Y10T 24/318; B60J 7/104; A44B 11/04; A44B 18/00
See application file for complete search history.

(56) References Cited

U.S. PATENT DOCUMENTS

| | | |
|---|---|---|
| 3,307,872 A | 3/1967 | Murcott |
| 3,383,738 A | 5/1968 | Fox et al. |
| 3,543,977 A | 12/1970 | Lockridge |
| 3,947,927 A | 4/1976 | Rosenthal |
| 3,994,048 A | 11/1976 | Rosenthal |
| 4,414,969 A | 11/1983 | Heyman |
| 4,428,390 A | 1/1984 | Baird |
| 4,854,015 A | 8/1989 | Shaull |
| 5,038,799 A | 8/1991 | Fowler et al. |
| 5,076,288 A | 12/1991 | Millard et al. |
| 5,100,393 A | 3/1992 | Johnson |
| 5,136,759 A | 8/1992 | Armour, II |
| 5,163,752 A | 11/1992 | Copeland et al. |
| 5,582,337 A * | 12/1996 | McPherson ............... A45F 3/14 24/306 |
| 5,598,995 A | 2/1997 | Meuth et al. |
| 6,049,953 A | 4/2000 | McCay et al. |
| 6,318,612 B1 | 11/2001 | MacNeil |
| 6,708,375 B1 * | 3/2004 | Johnson ............... A44B 15/005 24/300 |
| 6,892,912 B1 | 5/2005 | MacNeil |
| 7,081,072 B2 | 7/2006 | Allen |
| 2007/0062012 A1 * | 3/2007 | Caison ................. A44B 11/263 24/302 |
| 2008/0127461 A1 * | 6/2008 | Linden ...................... A45F 5/02 24/302 |

* cited by examiner

*Primary Examiner* — Robert J Sandy
(74) *Attorney, Agent, or Firm* — Faegre Baker Daniels LLP

(57) ABSTRACT

Improvements in a self-tightening holding strap that grips onto a tube. The strap uses an elastomeric cushion with hook and loop fasteners to hold the strap onto a tubular pipe. The hook and loop fasteners allows the self-tightening holding strap to be easily installed, removed and repositioned where desired. The elastomeric cushion conforms around a textured or powder coated surface to increase the gripping forces. The elastomeric cushion can expand slightly as forces increase but retain the high grip. A tightening clasp allows an installer to pull from only one side of the self-tightening holding strap with one or both hands and using the elastomeric cushion to prevent the self-tightening holding strap from sliding on the pole. The self-tightening holding strap to be sewn onto a cover, canopy or strap.

18 Claims, 4 Drawing Sheets

SELF-TIGHTENING HOLDING STRAP

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a self-tightening holding strap. More particularly, the present self-tightening holding strap creates.

2. Description of Related Art Including Information Disclosed Under 37 CFR 1.97 and 1.98

In the use of off-road vehicles

The use and popularity of on and off road all-terrain vehicles has expanded from utility products such as lawn mowers or tractors to a separate industry that allows recreational users to take versions of the vehicles off road to explore areas that would be difficult strenuous of require an extended time of travel. In the expansion of this segment of all-terrain vehicles the need to accommodate safety and comfort of the user is preferred. One common area that makes use of the vehicle more comfortable is a cover, canopy or tarp that covers the vehicle. These covers are typically made from fabric that is stretched over a tubular roll bar. The retention mechanism must accommodate the elements and vehicle flexing. It is also common to use a securing mechanism on the tubular frame to secure items such as but not limited to water, backpacks, fuel and coolers.

A number of patents and or publications have been made to address these issues. Exemplary examples of patents and or publication that try to address this/these problem(s) are identified and discussed below.

U.S. Pat. No. 6,892,912 issued on May 17, 2005 to David F. MacNeil discloses a Roof Top Carrier with Strap Attachment Loops. This patent uses multiple straps placed on the sides of the carrier. The straps are essentially open loops that extend from the carrier to the roof rack. The straps do not use elastomeric cushions to create friction on the pole. The strap remains open and the strap is tensioned by pulling onto the buckle. The strap does not provide 360 degrees of contact with the roof rack poles.

U.S. Pat. No. 6,318,612 issued on Nov. 20, 2001 to David F. MacNeil discloses a Device for Securing Items to a Vehicle. This patent disclose essentially a tether that passes around a handle on luggage around a roof rack of a vehicle This patent does not grip around the pole, it simply pulls on opposing poles to retain the luggage in the center top of the vehicle.

U.S. Pat. No. 5,598,995 issued on Feb. 4, 1997 to Thomas L. Meuth et al discloses a High Strength Clamp Assembly With Flexible Straps and Method of Using Same. While this patent discloses a removable strap the location of the strap on the pole can move. The patent relies upon using the strap to retain multiple poles together but does not provide a high friction inner surface to prevent the strap from being slid along the length of the pole(s).

U.S. Pat. No. 4,414,969 issued on Nov. 15, 1983 to Arnold M. Heyman discloses a Wrist Restraint. The wrist restraint has an inner cushion the wraps around the person being restrained. While this patent discloses a removable strap the location of the strap on the wrist on a person can move and rotate. The patent relies upon using the strap to retain the arms or legs of a person in a bed or chair but does not provide a high friction inner surface to prevent the strap from being slid along the length of the extremity(ies) of the person being restrained.

What is needed is a self-tightening holding strap that has a high coefficient of friction inner surface and increases gripping and grabbing forces when the straps are pulled parallel to the elongated length of the pole.

BRIEF SUMMARY OF THE INVENTION

It is an object of the self-tightening holding strap to use hook and loop fasteners to hold the strap onto a tubular pipe. The hook and loop fasteners allows the self-tightening holding strap to be easily installed, removed and repositioned where desired. Hook and loop fasteners hold tight against lateral forces that would pull across the multiple rows of hook and loop fasteners whereas forces pulling away from the hook and loop fasteners with normal forces will allow the hook and loop to be more easily pulled apart.

It is an object of the self-tightening holding strap to use an elastomeric cushion. The elastomeric cushion increases the coefficient of friction for the self-tightening holding strap onto the pole. The elastomeric cushion conforms around a textured or powder coated surface to increase the gripping forces. The elastomeric cushion can expand slightly as forces increase but retain the high grip. The elastomeric cushion can be made from a variety of materials based upon the surface being gripped. It is also possible for the elastomeric cushion to be textured. The amount of elastomeric cushion is sized to create a nearly 360 degree wrap on the pole to optimize the grip surface area.

It is an object of the self-tightening holding strap tightening clasp. The tightening clasp allows an installer to increase the hoop force of the self-tightening holding strap onto the tube. The tightening clasp allows an installer to pull from only one side of the self-tightening holding strap with one or both hands and using the elastomeric cushion to prevent the self-tightening holding strap from sliding on the pole.

It is another object of the self-tightening holding strap to be sewn onto a cover or canopy. When the self-tightening holding strap is sewn into or on a cover the installer can provide tension on the cover. When the canopy or cover is fabricated the self-tightening holding straps are sewn where the poles are located and reduce the number of secondary components that are required.

It is still another object of the self-tightening holding strap sewn onto a strap the straps can have a more universal usage where they can retain cargo. Tension on the straps further pull onto the self-tightening holding strap and increase the grip of the self-tightening holding strap by creating side loading that increases the hoop tension around the strap on the pole.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
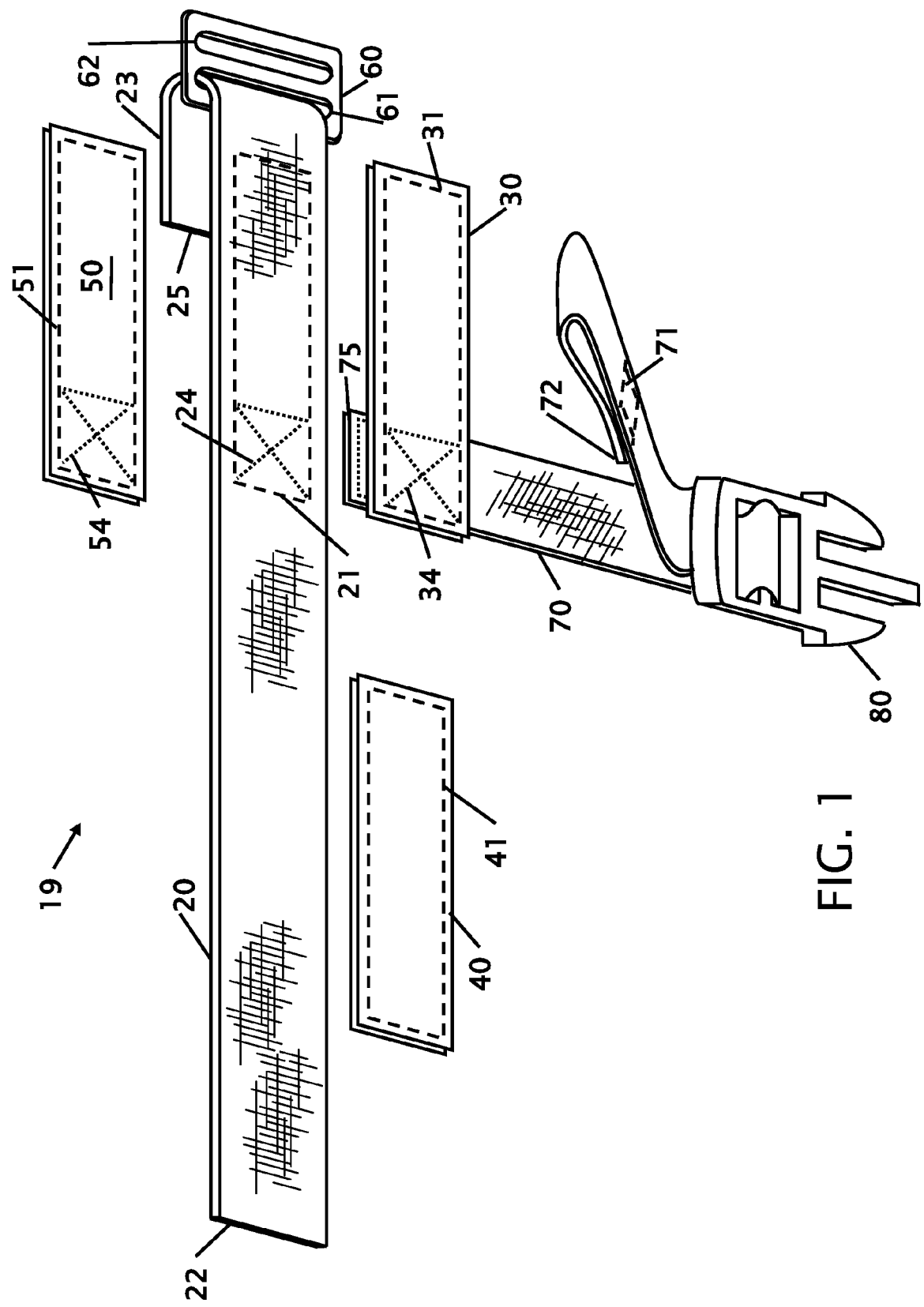
FIG. 1 shows an exploded view of the self-tightening holding strap.

FIG. 1 shows an exploded view of a self-tightening holding strap 19 in a first preferred embodiment. The self-tightening holding strap 19 starts with a woven nylon or similar base strap 20. In this preferred embodiment the strap is approximately one inch wide, but it is contemplated that the base strap 20 could be as narrow as ¼ inch or narrower to two inched or greater in width. Both ends 22, 25 of the base strap are heat sealed, glued or otherwise treated to prevent the woven material of the base strap 21 from fraying or loosening.

A first end 24 of the base strap 20 passes through a first loop 61 of a dual ring 60. The dual ring 60 has a first loop 61 for securing the loop 23 of the base material and a second ring 62 for looping the free end 22 of the base strap 20. The second end 22 of the base strap 20 is essentially free. The overall length of the base strap 20 is dependent upon the diameter of a tube (not shown in this figure) where the self-tightening holding strap 19 will be secured. The first end is then folded back 23 upon the base strap 20 for securing under an elastomeric pad 50.

The elastomeric pad provide gripping forces on a tube (not shown in this figure) where the self-tightening holding strap 19 will be secured. On the opposite side of the base strap 20, a strip of hook material 30 is placed. The elastomeric strip 50 and the strip of loop material 30 is sewn 31, 21 and 51 or otherwise secured to the base strap 20.

A complimentary strip 40 of hook material is sewn 41, bonded or otherwise secured onto the base strap 20 on the same side as the loop strip 30 is secured. The length of the loop strip 30 and the length of the hoop strip 40 are essentially the same, and are sized to create a complete overlap around the tube (not shown in this figure). In this first preferred embodiment a perpendicular strap 70 is shown.

Both ends 72 and 75 of the perpendicular strap 70 are treated to prevent fraying of the ends 72 and 75. A first end 75 is positioned parallel with an outer edge of the base strap 20. The opposing end of the perpendicular strap 70 is sealed 72 and looped 71 to provide an easier gripping surface to pull the strap tightly. A clasp 80 is secured to the perpendicular strap 70. When the perpendicular strap 72 is sewn onto the base strap 20 additional stitching 24, 34, 54 is used to improve the retention of the perpendicular strap 72.

When tension forces are place onto the perpendicular strap 72 the base strap 20 is distorted from a circle to an oval thereby reducing the effective gripping diameter of the base strap an increases the gripping forces of the elastomeric pad 50 thereby self-tightening the grip of the holding strap onto a pole where the strap 19 is mounted.

Figure 2:
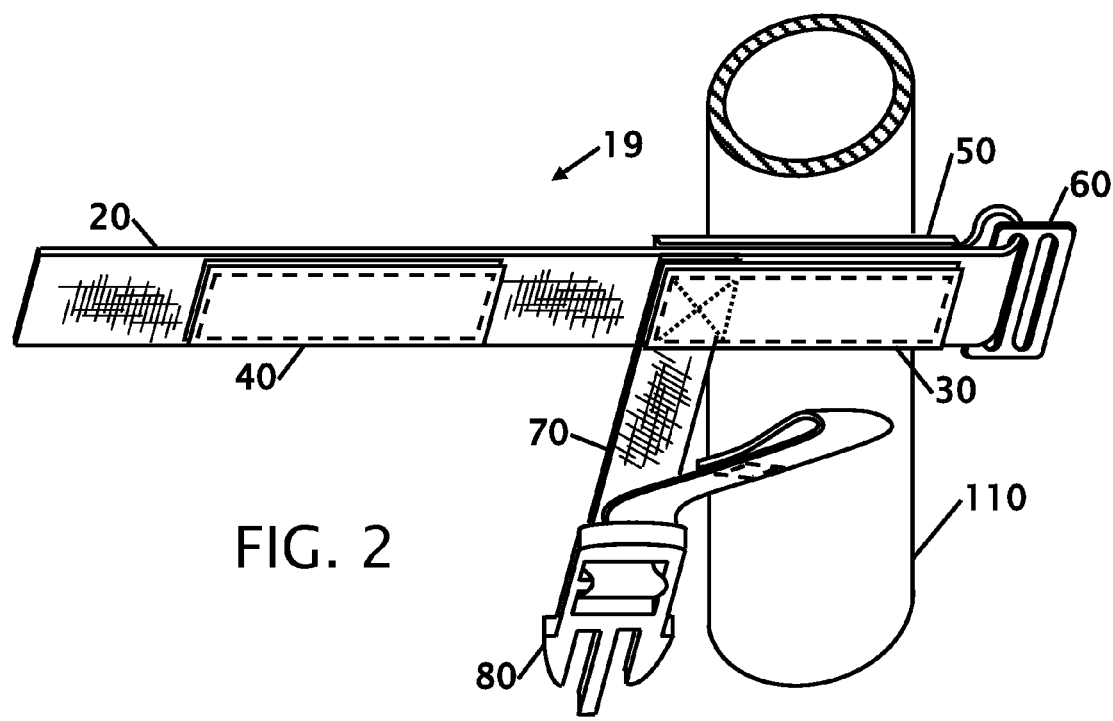
FIG. 2 shows an assembled view of the self-tightening holding strap.

FIG. 2 shows an assembled view of the self-tightening holding strap 19. This figure includes a pole 110 where the self-tightening holding strap 19 would be wrapped around. The self-tightening holding strap 19 is placed onto the pole 110 with the elastomeric pad 50 placed onto the pole with the base strap 20 on the outside of the elastomeric pad 20. The hook 30 and loop 40 patches are configured on the outer surface of the base strap 20. The buckle 60 is shown on one side of the pole 110 and the free end of the base strap 20 is shown on the opposite side of the pole 110. To secure the self-tightening holding strap 19 to the pole 110 the free end of the base strap is placed through the buckle 60.

The wrap of the hook and loop fasteners 30, 40 and the elastomeric pad 50 are configured to provide a wrap and of between 90 degrees and 320 around the pole. These wrap angles provide clearance for the buckle 60 and provide sufficient engagement around the pole 110. More preferably the wrap angle is 180 to 320 degrees.

In this configuration, the perpendicular strap 70 is shown in the hanging down, but could also be configured in an inverted configuration. A backpack, water bottle, cooler or other item can be secured to the buckle 80 and tightened with the tension strap on the perpendicular strap 70. Tension on the perpendicular strap 70 places side loading on the base strap 20 that increases the hoop stresses in the self-tightening holding strap 19 an increases the grip on the pole 110.

Figure 3:
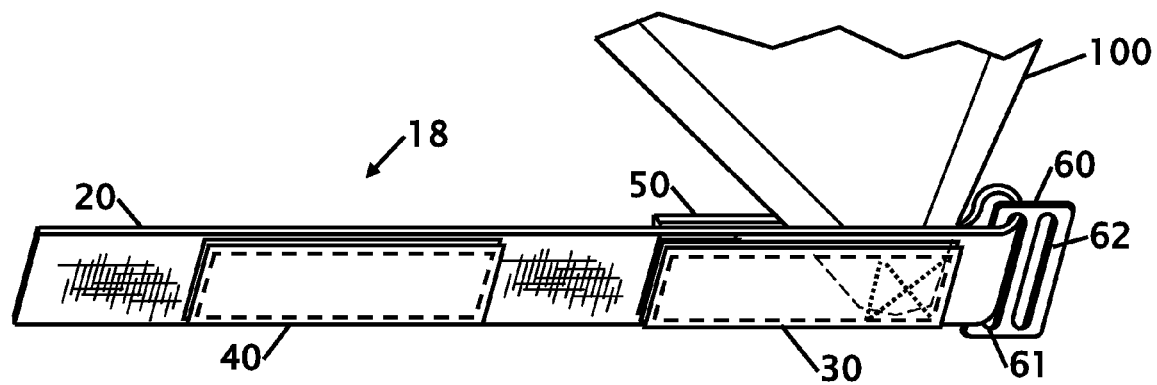
FIG. 3 shows the self-tightening holding strap joined to a tarp cover.

FIG. 3 shows the self-tightening holding strap 18 joined to a tarp cover 100. The tarp cover 100 is sewn or otherwise joined to the base strap 20 in an area between the elastomeric pad 50 and the base strap 20. The hook 30 and loop 40 patches are similarly sewn, bonded or joined onto the base strap 20. The self-tightening holding strap 18 is wrapped around pole or roll bar of the off road vehicle. The free end of the base strap 20 is wrapped around the pole and the free end of the base strap 20 is passed through the open hole 62 in the buckle 60, pulled back and the loops 40 patch is secured onto the hook patch 30. The installation of the self-tightening holding strap 18 is shown and described in more detail with FIG. 4 through FIG. 7.

Figure 4:
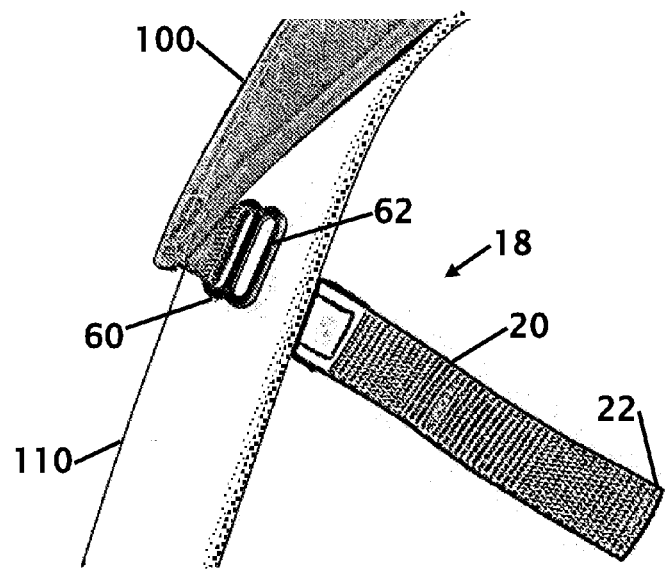
FIG. 4 shows the self-tightening holding strap on a tarp cover placed partially around a roof tube.
Figure 5:
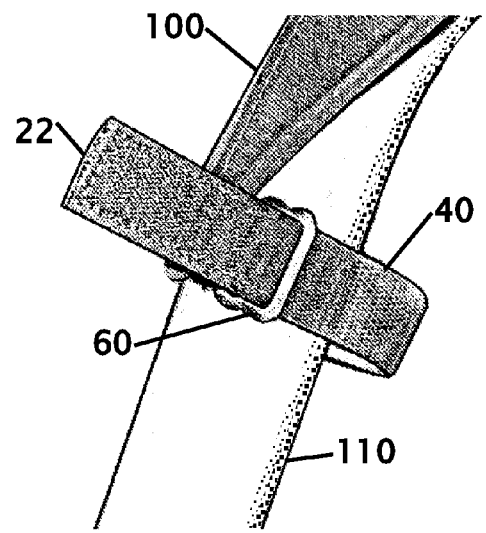
FIG. 5 shows the self-tightening holding strap on a tarp cover strapped around a roof tube.
Figure 6:
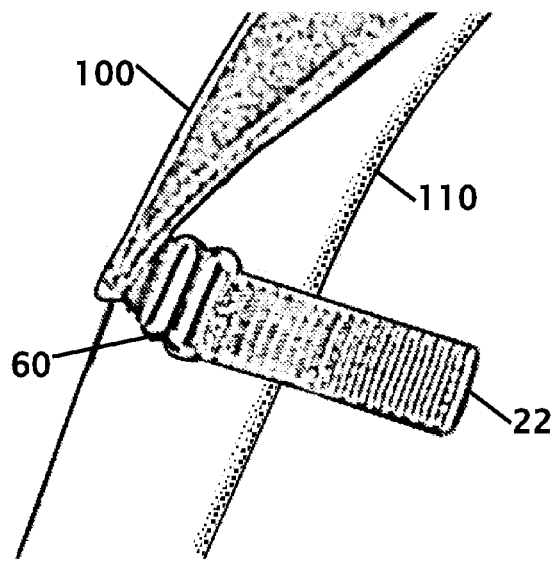
FIG. 6 shows the self-tightening holding strap on a tarp cover being pulled around a roof tube.
Figure 7:
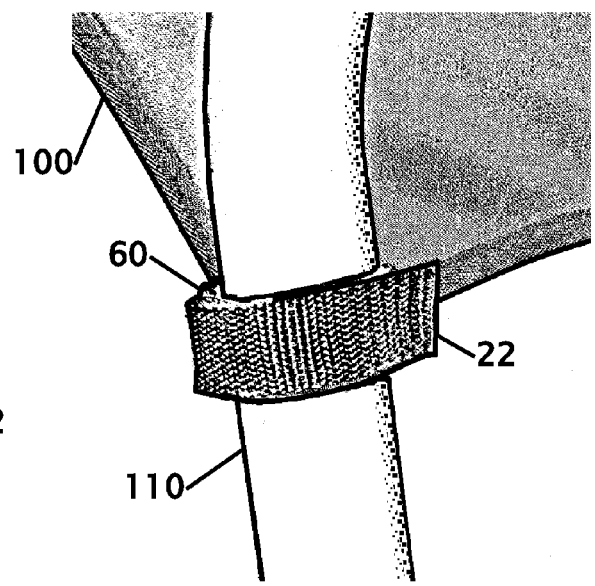
FIG. 7 shows the self-tightening holding strap on a tarp cover tightened around a roof tube.

FIG. 4 shows the self-tightening holding strap on a tarp cover placed partially around a roof tube, FIG. 5 shows the self-tightening holding strap on a tarp cover strapped around a roof tube, FIG. 6 shows the self-tightening holding strap on a tarp cover being pulled around a roof tube and FIG. 7 shows the self-tightening holding strap on a tarp cover tightened around a roof tube. In FIG. 4 the self-tightening holding strap 18 is placed over the pole support 110 of the frame or roll bar. The cover 100 is pulled down onto the pole 110 where the self-tightening holding strap 18 will be secured.

From FIG. 5 the free end 22 of the base strap 20 is placed through the open hole 62 of the clasp 60 and pulled through the open hole. The free end 22 of the base strap 20 is pulled against the clasp to increase the hoop load and the forces of the elastomeric pad against the pole 110 in the self-tightening holding strap 18. As the free end 22 is pulled tight the free end 22 is brought back over the base strap 20 where the hook 30 and loops 40 and secured together as shown in FIG. 7.

Figure 8:
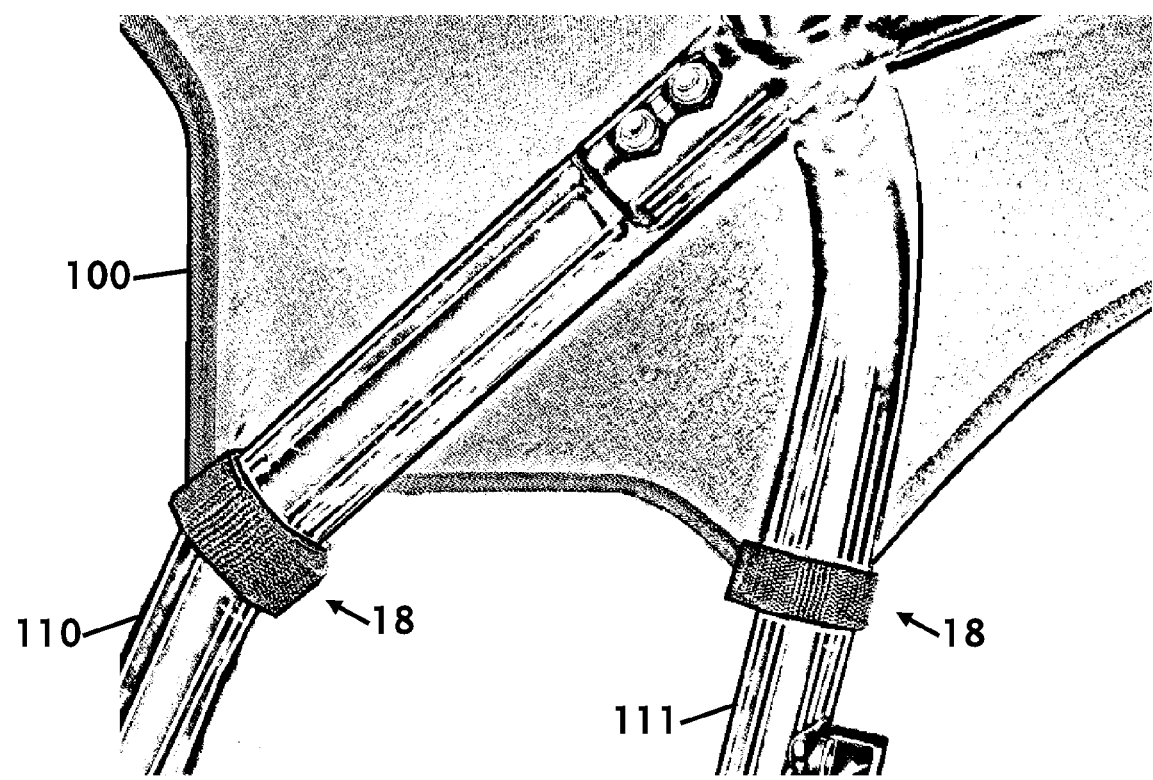
FIG. 8 shows the self-tightening holding straps on roof tubes.

FIG. 8 shows the self-tightening holding straps on roof tubes 110 and 111. This view shows a section of the cover 100 with two self-tightening holding strap 18 on each pole 110 and 111 of an off road vehicle. The cover 100 will be secured at the corners of the off road vehicle. Tension of the cover 100 on the self-tightening holding straps 18 creates perpendicular loads to the self-tightening holding strap 18 and increases the gripping force of the self-tightening holding strap(s) 18 on the respective pole(s). This figure shows that the free tail end 22 of the base strap covers the buckle 60.

Thus, specific embodiments of a self-tightening holding strap have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A self-tightening holding strap comprising:
  a base strap sized to wrap essentially twice around a pole where said base strap is being secured;
  said base strap having a buckle with a first elongated opening and a second elongated opening, wherein at least a portion of said base strap loops through said first elongated opening and back onto an inside surface of said base strap;
  an elastomeric strap secured to an inside of said base strap covering to wrap between 90 degrees and 320 degrees of said pole;
  said elastomeric strap configured adjacent to said buckle and covering said at least a portion of said base strap that looped through said buckle;
  a first strip of hook and loop fastener secured to an outside of said base strap;
  said first strip of hook and loop fastener sized to wrap between 90 degrees and 320 degrees of said pole;
  a second complimentary strip of said hook and loop fastener secured to said outside of a base strip, thereby allowing complimentary said hook and loop fasteners to join when a free end of said base strap is passed through said second elongated opening and folded back onto said base strap, and
  a perpendicular tension strap joined to said base strap whereby loading on said perpendicular tension strap increases a grip force of said elastomeric strip on said pole.

2. The self-tightening holding strap according to claim 1 wherein said elastomeric strap is rubber.

3. The self-tightening holding strap according to claim 1 wherein said base strap is selected from a group consisting of nylon, polypropylene, vinyl and cotton.

4. The self-tightening holding strap according to claim 1 wherein a securing is with sewing.

5. The self-tightening holding strap according to claim 1 wherein a securing is with thermal bonding.

6. The self-tightening holding strap according to claim 1 wherein a securing is with gluing.

7. The self-tightening holding strap according to claim 1 wherein said perpendicular tension strap is joined to said base strip at a location under said elastomeric strip.

8. The self-tightening holding strap according to claim 1 wherein said perpendicular tension strap further includes a clasp.

9. The self-tightening holding strap according to claim 8 wherein said clasp is adjustable to alter a length of said perpendicular tension strap between said base strip and said clasp.

10. A self-tightening holding strap comprising:
  a base strap sized to wrap essentially twice around a pole where said base strap is being secured;
  said base strap having a buckle with a first elongated opening and a second elongated opening, wherein at least a portion of said base strap loops through said first elongated opening and back onto an inside surface of said base strap;
  an elastomeric strap secured to an inside of said base strap covering to wrap between 90 degrees and 320 degrees of said pole;
  said elastomeric strap configured adjacent to said buckle and covering said at least a portion of said base strap that looped through said buckle;
  a first strip of hook and loop fastener secured to an outside of said base strap;
  said first strip of hook and loop fastener sized to wrap between 90 degrees and 320 degrees of said pole;
  a second complimentary strip of said hook and loop fastener secured to said outside of said base strip, thereby allowing complimentary said hook and loop fasteners to join when a free end of said base strap is passed through said second elongated opening and folded back onto said base strap, and
  a base strip is secured to a tarp or cover whereby forces on said tarp or cover increases a grip force of said elastomeric strip on said pole.

11. The self-tightening holding strap according to claim 10 wherein said elastomeric strap is rubber.

12. The self-tightening holding strap according to claim 10 wherein said base strap is selected from a group consisting of nylon, polypropylene, vinyl and cotton.

13. The self-tightening holding strap according to claim 10 wherein a securing is with sewing.

14. The self-tightening holding strap according to claim 10 wherein a securing is with thermal bonding.

15. The self-tightening holding strap according to claim 10 wherein a securing is with gluing.

16. The self-tightening holding strap according to claim 10 wherein said tarp or cover is joined to said base strip at a location under said elastomeric strip.

17. The self-tightening holding strap according to claim 10 wherein said tarp or cover extends as a cover for an off road vehicle.

18. The self-tightening holding strap according to claim 17 wherein at least four self-tightening holding straps are used to secure said cover.

* * * * *